(12) United States Patent
Douglas et al.

(10) Patent No.: US 11,186,207 B2
(45) Date of Patent: Nov. 30, 2021

(54) SYSTEMS AND METHODS FOR RETAINING A CROTCH BUCKLE

(71) Applicant: Evenflo Company, Inc., Miamisburg, OH (US)

(72) Inventors: Jeffrey Douglas, Charlotte, NC (US); Jason Byrd, Huntersville, NC (US)

(73) Assignee: Evenflo Company, Inc., Miamisburg, OH (US)

( * ) Notice: Subject to any disclaimer, the term of this patent is extended or adjusted under 35 U.S.C. 154(b) by 0 days.

(21) Appl. No.: 16/658,330

(22) Filed: Oct. 21, 2019

(65) Prior Publication Data
US 2021/0114490 A1    Apr. 22, 2021

(51) Int. Cl.
*B60N 2/28* (2006.01)

(52) U.S. Cl.
CPC .... *B60N 2/2812* (2013.01); *B60N 2002/2818* (2013.01)

(58) Field of Classification Search
CPC .......... B60N 2/2812; B60N 2002/2818; B60R 22/105; B64D 11/0612; B64D 11/0619; B64D 11/062
See application file for complete search history.

(56) References Cited

U.S. PATENT DOCUMENTS

| | | | |
|---|---|---|---|
| 5,061,012 A * | 10/1991 | Parker | B60N 2/286 297/467 |
| 5,472,260 A * | 12/1995 | Czapski | B60N 2/3084 297/112 |
| 6,089,662 A * | 7/2000 | Lambert | B60R 22/105 297/238 |
| 6,588,849 B2 | 7/2003 | Glover et al. | |
| 7,861,341 B2 * | 1/2011 | Ayette | A61G 1/044 5/621 |
| 8,944,503 B2 * | 2/2015 | Gates | B60N 2/2812 297/256.15 |
| 8,955,915 B2 | 2/2015 | Mason et al. | |
| 9,187,059 B2 * | 11/2015 | Powell | B60N 2/2812 |
| 9,701,224 B2 * | 7/2017 | Yang | B60N 2/2812 |
| 9,758,067 B2 | 9/2017 | Williams et al. | |
| 9,776,534 B2 * | 10/2017 | Yang | B60N 2/2812 |
| 9,878,642 B2 * | 1/2018 | Frank | B60N 2/2884 |
| 2002/0109391 A1 | 8/2002 | Shie | |
| 2011/0006572 A1 * | 1/2011 | Zhao | B60N 2/2812 297/256.15 |
| 2016/0068084 A1 | 3/2016 | Williams et al. | |

* cited by examiner

*Primary Examiner* — David R Dunn
*Assistant Examiner* — Tania Abraham
(74) *Attorney, Agent, or Firm* — BakerHostetler (57) ABSTRACT

The present disclosure pertains to a system configured to secure a crotch plate of a child car seat while providing for lower forces upon the seated child during impact events. Some embodiments may include: a seating surface and a back surface; an internal harness, including a crotch strap; a crotch plate for mounting the crotch strap thereto; and at least one connection member for connecting the crotch plate to an anchor mounted below the seating surface. The at least one connection member may significantly resist movement in a first direction and may significantly allow movement in a second direction different from the first direction.

19 Claims, 8 Drawing Sheets

SYSTEMS AND METHODS FOR RETAINING A CROTCH BUCKLE

TECHNICAL FIELD

The present disclosure relates generally to systems and methods for retaining a crotch buckle, in tension, and for yielding to a load, in compression.

BACKGROUND

Safety seats for children are designed to secure the occupant during crash events. Known, bottom portions of these seats, including the seat pan, are entirely stationary. Typically, the crotch buckles of these seats are attached to a horizontal crossbar that runs from either side horizontally underneath the seat or near a front of the seat. During forward facing crash events, there is little to no absorption of energy via a base of the seat pan in such configurations.

SUMMARY

Systems and methods are disclosed for providing a tensile member that provides resistance in a tensile direction but allows movement in a compressive direction. Some embodiments may include: a seating surface and a back surface; an internal harness, including a crotch strap; a crotch plate for mounting the crotch strap thereto; and at least one connection member for connecting the crotch plate to an anchor mounted below the seating surface. The at least one connection member may significantly resist movement in a first direction and may significantly allow movement in a second direction different from the first direction.

Implementations of any of the described techniques may include a method or process, an apparatus, a device, a machine, or a system.

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

DETAILED DESCRIPTION

As used throughout this application, the word "may" is used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

These drawings may not be drawn to scale and may not precisely reflect structure or performance characteristics of any given embodiment, and should not be interpreted as defining or limiting the range of values or properties encompassed by example embodiments.

A forward facing dynamic event may be a crash of a vehicle, in which a child car seat is mounted. The child in the seat may face a front of the vehicle. During such dynamic event the child may be forced out of the seat towards a seat belt harness and be returned to the seat in a forceful manner impacting the seat bottom. Conversely, during a rear facing dynamic event in which the child car seat is mounted such that the child in the seat faces a rear of the vehicle, the child may be forced towards the back of the seat and may slide upward into the harness. Presently disclosed are ways of securing aspects of a child car set, while reducing forces to a child in the seat during said aforementioned events.

Figure 1:
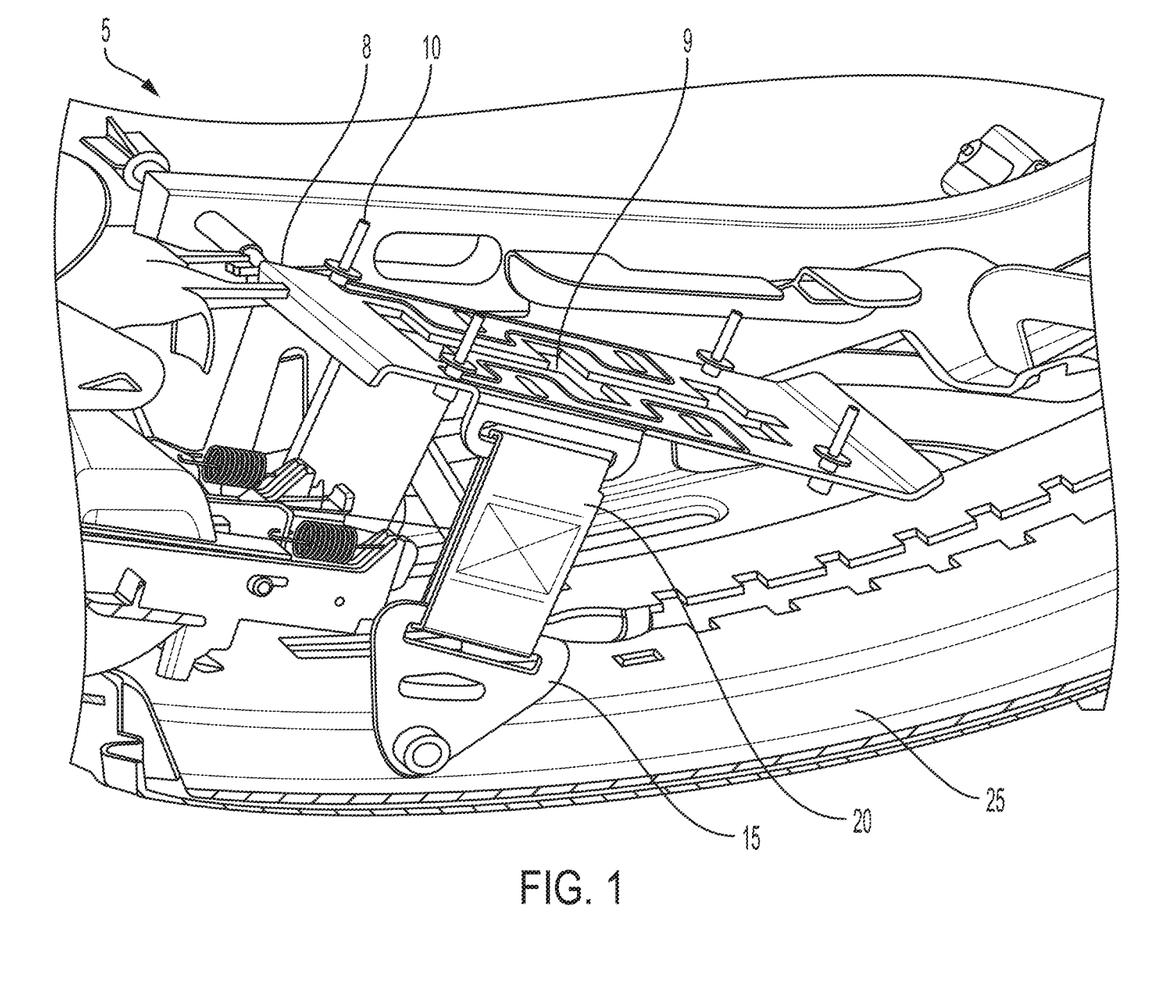
FIG. 1 illustrates a sectional view of components of a base portion of a child car seat before being affixed to a seat pan, in accordance with one or more embodiments.

Disclosed embodiments relate to a seat's crotch plate constrained by one or more connection members. FIG. 1 illustrates, in a sectional view, a base portion of child car seat system 5 that optimally secures a harness, including a crotch buckle assembly. More particularly, seat 5 may be configured to withstand tensional forces in rear facing collisions and to allow compressive absorption in front facing collisions. Some embodiments of seat 5 may, as a result, provide less chest gravitational forces to a child in the seat during such events.

FIG. 1 further illustrates a top surface of crotch plate 8 before being affixed, via rivets 10, to a bottom surface of a seat pan. Although two pieces of seat belt webbing 20 are depicted in FIG. 1, only one connection member may be necessary to constrain and give strength to crotch plate 8 in tension for rear facing seat orientations. Connection member 20 may thus be used to secure crotch plate 8 so that, in a rear facing impact, the connection member 20 acts as sufficient structure to hold the above seat belt harness system in tension. Connection member 20 may further allow compressive forces towards the seat bottom with minimal resistance, in front facing seat orientations.

In some embodiments, crotch plate 8 may be substantially flat and may extend in a substantially transverse direction with respect to the compressive and tensile directions to which connection member 20 may be subjected.

Figure 2:
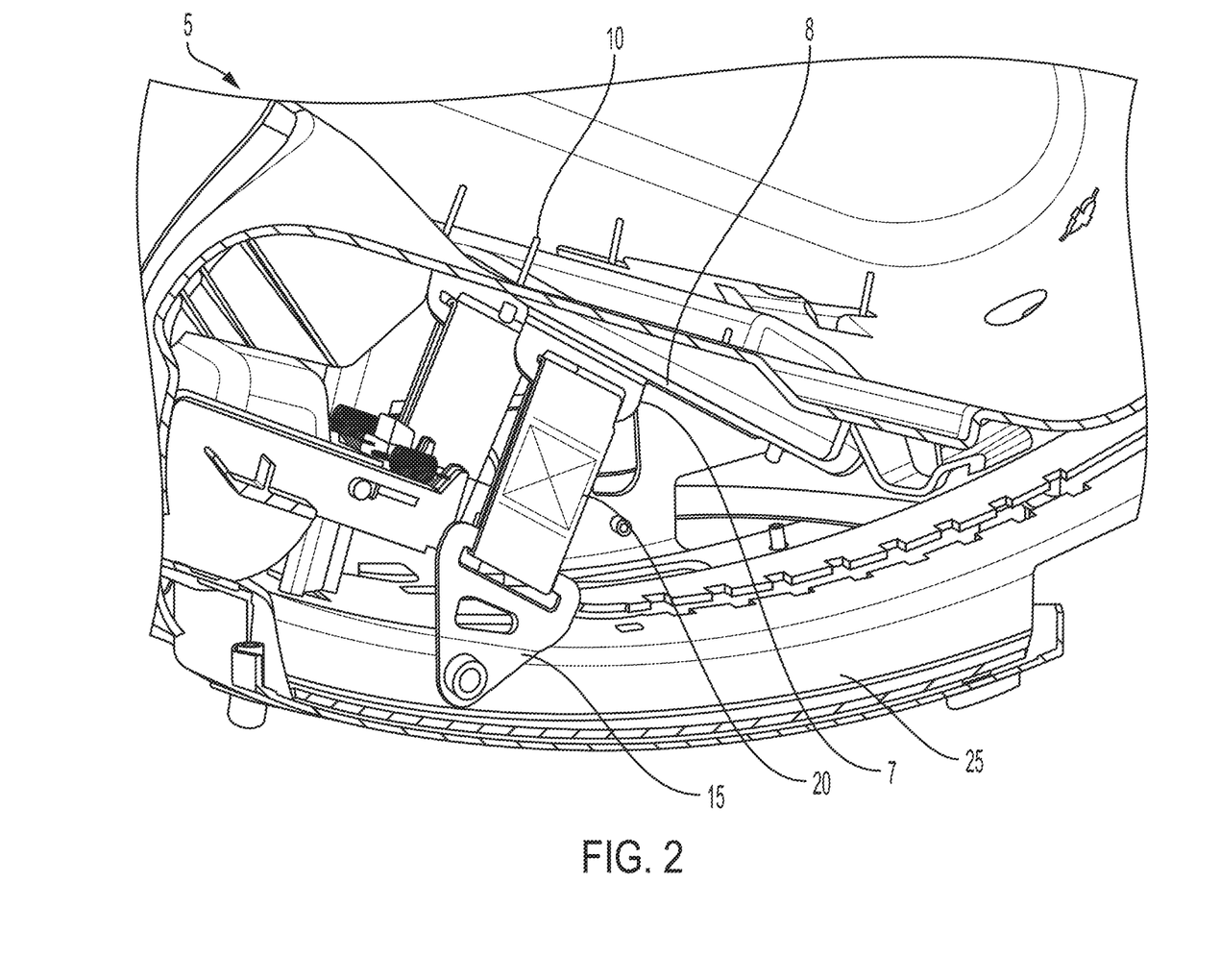
FIG. 2 illustrates a sectional view of the components of the base portion of the child car seat after being affixed to the seat pan, in accordance with one or more embodiments.

FIG. 2 illustrates a sectional view of the components of the base portion of the child car seat after being affixed to the seat pan, in accordance with one or more embodiments. In some embodiments, crotch plate 8 may be attached to an underside of seating surface 60 (which is more explicitly depicted in FIGS. 3-6) using rivets 10 or using another, suitable set of fasteners.

Each connection member 20 depicted in FIG. 2 may comprise an intermediate stitching portion and two end portions for mounting to crotch plate 8 and anchor plate 15. For example, crotch plate 8 may comprise one or more loops 7 around which an end portion of each connection member 20 may loop. In this or another example, each anchor plate 15 may comprise a loop around which another end portion of each connection member 20 may loop. Each of the plates of this disclosure may be made of a same or different material (e.g., steel). The base portion of seat 5 may further comprise frame 25 with respect to which each of anchor plates 15 may be attached.

In some embodiments, impact on a child is softer, via use of connection member 20, than if, e.g., an unyielding steel crossbar were otherwise used. This may be true, e.g., in a front facing configuration of the child car seat. In a rear facing configuration, connection member 20 may be used to help restrain and constrain the child in the desired position.

In some embodiments, connection members 20 may be straps and may be made of a same fabric or webbing and of a same stitching via which seat belts are typically manufactured. In other embodiments, connection member 20 may be a spring, at least one piece of metal with a raised track and a pin, a shiplap with a pin, webbing, a rubber band, a shock absorber, steel cabling, or other suitable structures for preventing upward movement from a bottom of the seat, and/or a spring damper for allowing downward movement towards a bottom frame of the seat. Some embodiments may thus prevent upward movements, while allowing downward movements.

In some embodiments, connection member 20 may have a tensile strength up to about 2,000 pounds per square inch (PSI). In some embodiments, connection member 20 may provide negligible resistance in the compressive direction, this direction being, e.g., from crotch plate 8 towards anchor plate 15.

Some embodiments may provide two connection members 20 in a symmetric configuration, as depicted in FIGS. 1-2. In these or other embodiments, connection member 20 may comprise two or more straps each separately coupled to one of the anchor plates and the crotch plate. In some embodiments, connection member 20 may be configured to elongate a small amount to better absorb energy.

Figure 3:
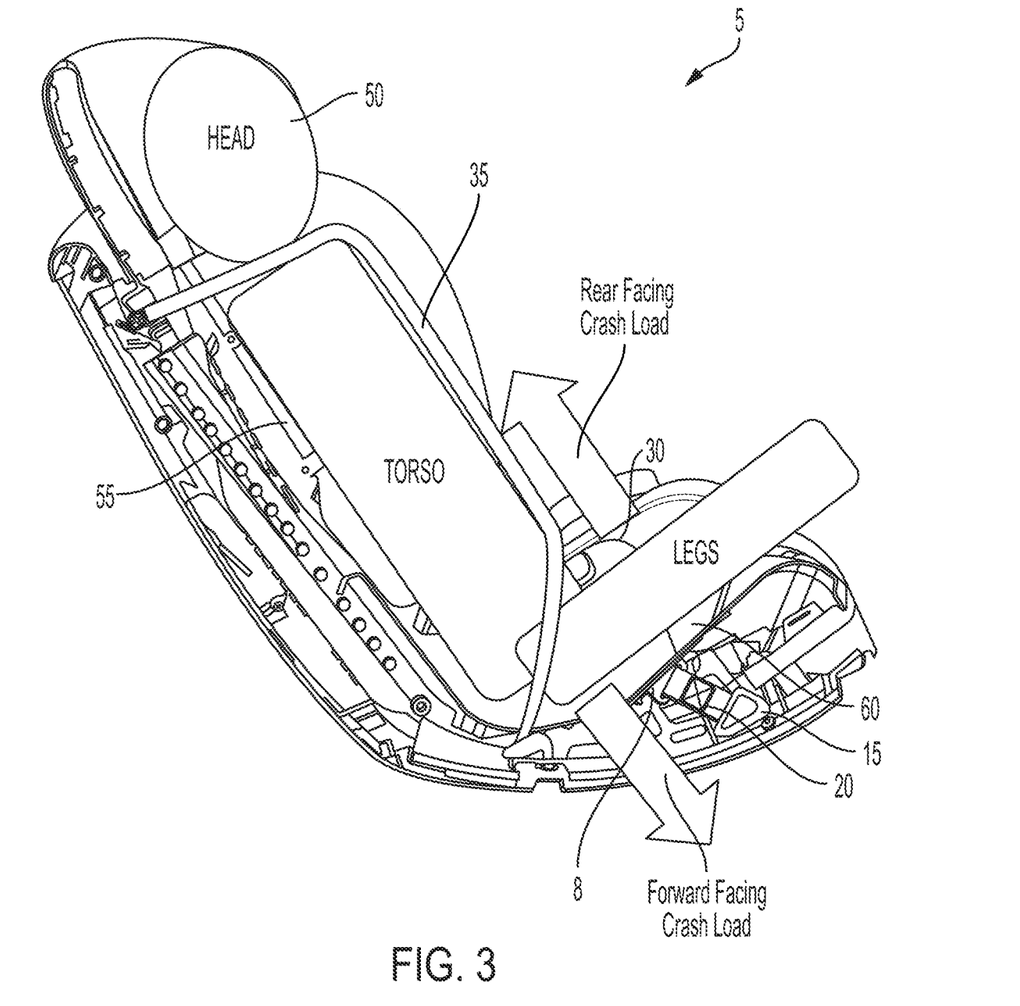
FIG. 3 illustrates a cross-sectional view of the entire seat, in accordance with one or more embodiments.

FIG. 3 illustrates a cross-sectional view of the entire seat 5, including an occupant of said seat, in accordance with one or more embodiments. For example, an entirety of seat 5 may comprise a base portion, a back portion, and a harness assembly. The base portion may include seat pan 60, crotch plate 8, connection member 20, anchor plate 15, frame 25, and a crotch buckle assembly. The crotch buckle assembly may comprise crotch buckle 30, crotch strap 31, end portion 32, and crotch buckle anchor plate 33. The back portion may include seat back 55. In some embodiments, an upper portion of harness 35 may be provided to pass over the seat occupant's left and right shoulders. And a lower portion of harness 35 may be provided to pass down to crotch buckle 30 and then over the seat occupant's left and right legs to hip anchors 38. Harness 35 may be indirectly coupled to crotch plate 8 such that connection member 20 provides very strong resistance to the (e.g., upward) rear facing tensile load, while providing little to no resistance to the (e.g., downward) forward facing compressive load.

Child 50, when seated in car seat 5, may have his or her legs upon seat pan 60. Seat pan 60 may be made of plastic and may further comprise a cushion. Plastic seat pan 60 may absorb some of the shock of the forward facing impact, e.g., by deforming itself in response thereto.

In some embodiments, seat 5 is configured to rotate. In these or other embodiments, seat 5 is configured to convert between front-facing and rear-facing (e.g., via one or more adjustments).

Figure 4:
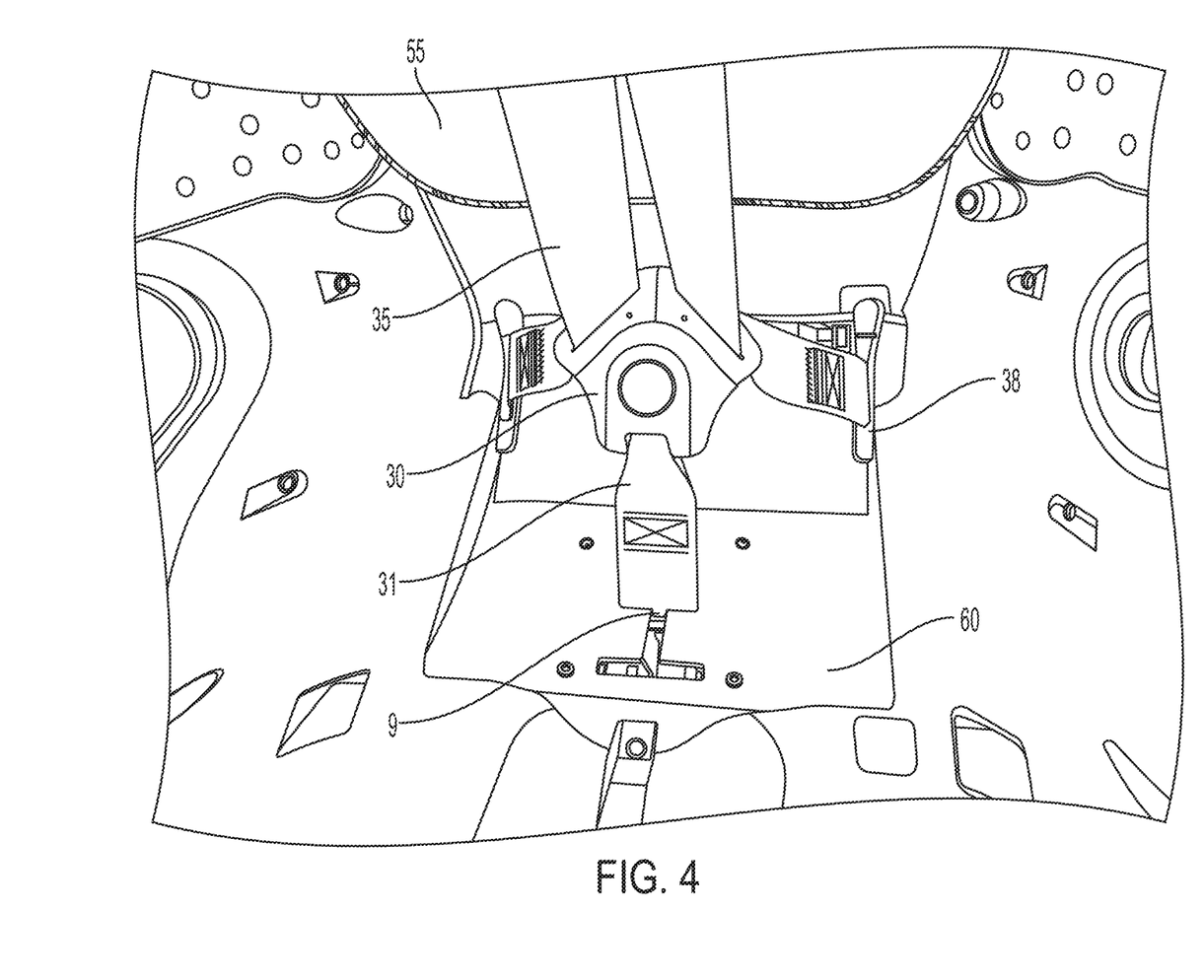
FIG. 4 illustrates the base portion of the child car seat with an installed seat belt harness and crotch buckle, in accordance with one or more embodiments.

FIG. 4 illustrates the base portion of the child car seat, including left and right straps of seat belt harness 35, crotch buckle 30, and crotch strap 31, in accordance with one or more embodiments. More particularly harness 35 and its lower components are depicted installed at left and right hip anchors 38 and at crotch plate 8 through slot 9. Crotch buckle 30 may comprise a button for releasing attachment of left and right straps of seat belt harness 35 used for restraining a child's back and legs to seat back 55 and seat pan 60, respectively.

Figure 5:
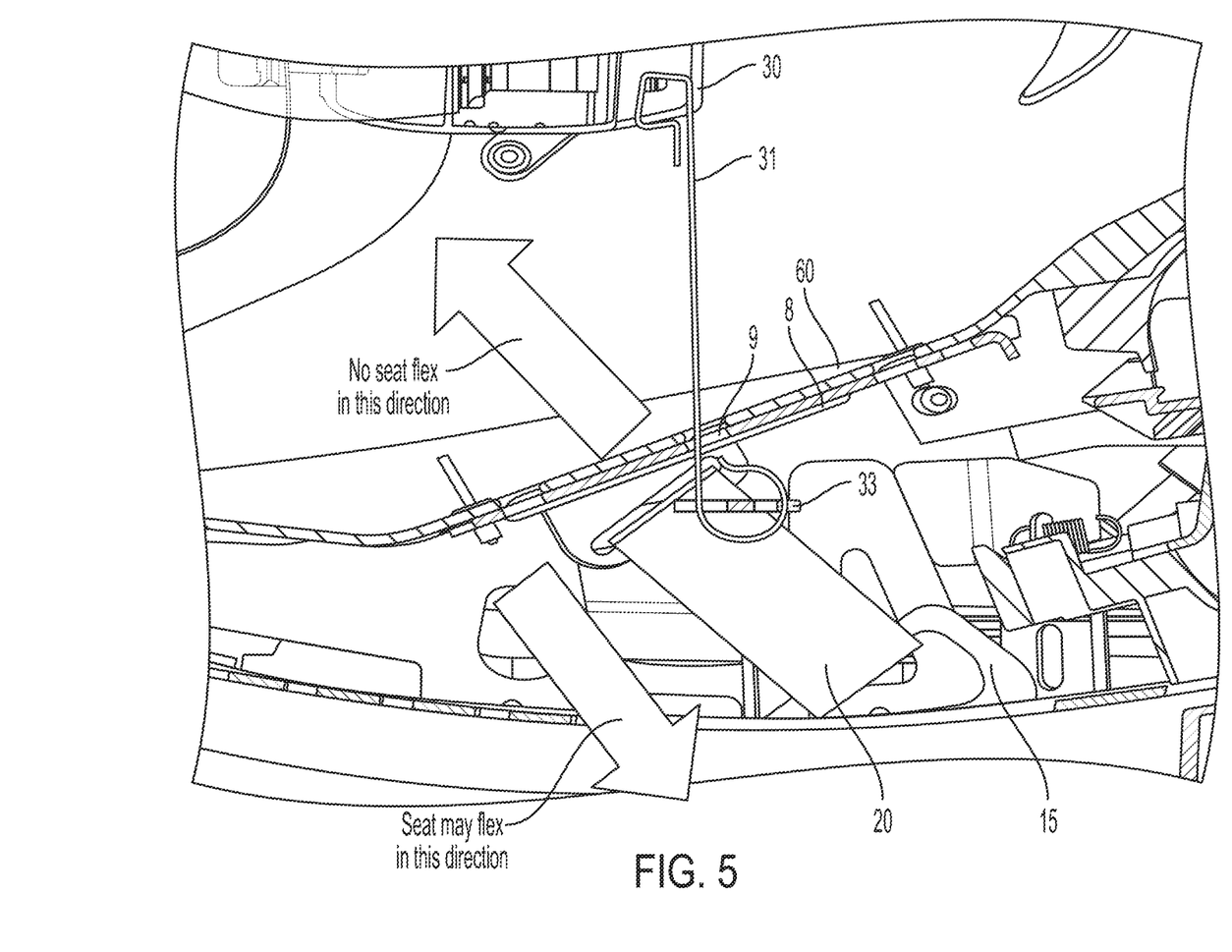
FIG. 5 illustrates a cross-sectional view of the base portion of the child car seat after being affixed to the seat pan and in relation to different impact scenarios, in accordance with one or more embodiments.

FIG. 5 illustrates a cross-sectional view of the base portion of the child car seat after being affixed to the seat pan and in relation to different impact scenarios, in accordance with one or more embodiments. More particularly, upward tension through crotch buckle 30 may pull crotch strap 31 such that crotch buckle anchor plate 33 is pressed against crotch plate 8. Such tension forces may be present during normal use as well as during rear and front facing crash events. In some embodiments, crotch buckle anchor plate 33 may always remain below crotch plate 8, unless removed by the user for replacement or cleaning of the harness assembly. FIG. 5 further shows that seat pan 60 may, in some embodiments, be configured to adjust or flex only in the compressive direction (e.g., when in a forward facing impact).

In some embodiments, seat pan 60 may compress to absorb the energy of the child moving towards crotch plate 8 in a front facing impact. Connection member 20 may thus be soft in the compressive direction so that seat 5 offers little to no resistance. For rear facing impacts, harness 35 may hold the child close to seat pan 60 to prevent him or her from accelerating up seat back 55. In such rear facing impacts, connection member 20 may prevent crotch buckle 30 from pulling seat pan 60 up. Connection member 20 may thus be configured to a very-high, predetermined stiffness in tension but be extremely weak in the opposite, compressive direction. Exhibition of these properties may depend on a seat orientation during the impact (crash) event.

Some embodiments of seat 5 lower forces on the child during front and rear facing impact events. For example, in front facing impacts, the child's bottom may move against seat pan 60, and connection member 20 may allow seat pan 60 to absorb that movement by not being stiff. And, in rear facing impacts, connection member 20 may prevent chest spikes by catching the child and preventing him or her from accelerating up seat back 55 before the seat bottoms out on the belt.

Figure 6:
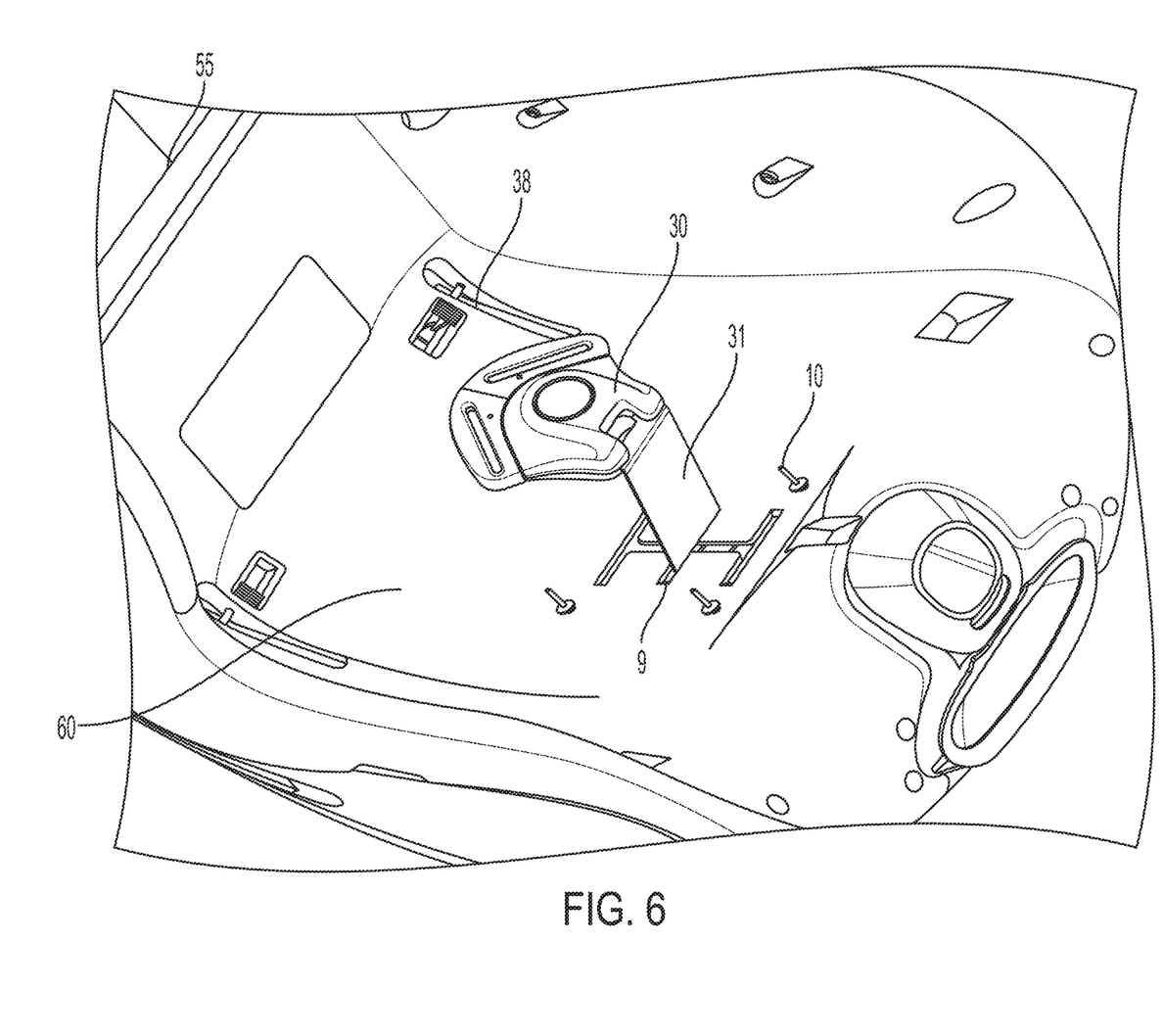
FIG. 6 illustrates a topside view of the base portion of the child car seat with a crotch buckle assembly installed through a middle slot of openings in the seat pan, in accordance with one or more embodiments.

FIG. 6 illustrates a topside view of the base portion of the child car seat with a crotch buckle assembly installed through a middle slot of openings in the seat pan, in accordance with one or more embodiments. In some embodiments, crotch buckle 30 may be positioned via any of the possible slot locations 9 by twisting crotch strap 31 into the slot and by passing the strap through; in FIG. 6, three opening locations 9 are depicted, but this is not intended to be limiting as any suitable number of openings may be provided.

Figure 7:
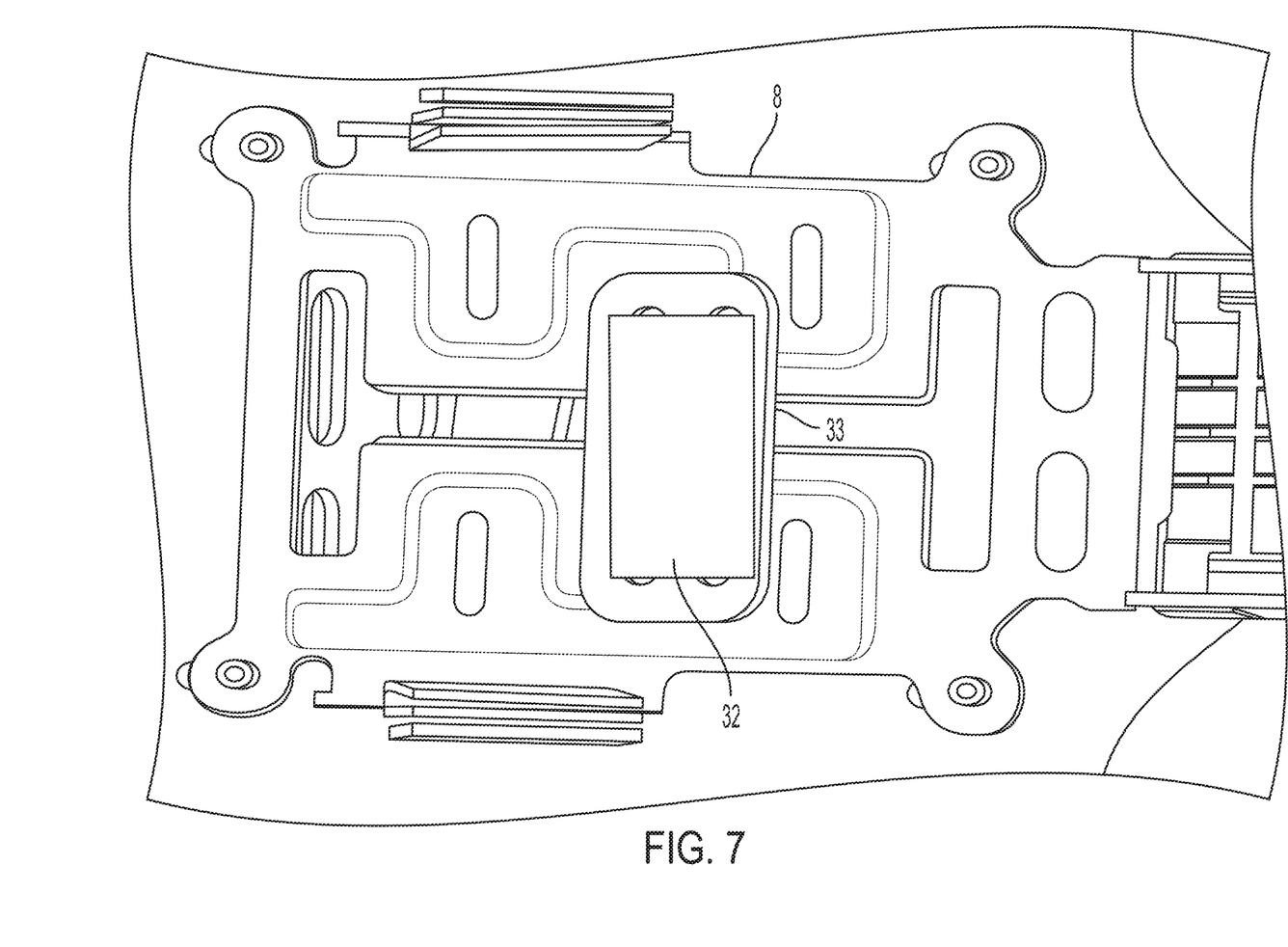
FIG. 7 illustrates an underside view of the base portion of the child car seat with the crotch buckle assembly installed through the middle slot of the openings in the seat pan and through a middle slot of openings in a crotch plate, in accordance with one or more embodiments.

FIG. 7 illustrates an underside view of the base portion of the child car seat with the crotch buckle assembly installed through the middle slot of the openings in the seat pan and through a middle slot of openings in a crotch plate, in accordance with one or more embodiments. In some embodiments, crotch buckle 30 may transfer harness 35 load, in a rear facing crash event, to crotch plate 8 using crotch strap end portion 32 and crotch buckle anchor plate 33. In some embodiments, crotch buckle anchor plate 33 is used to mount to crotch plate 8. More specifically, end portion 32 of crotch strap 31 may be attached to crotch buckle anchor plate 33. In some embodiments, crotch buckle anchor plate 33 may be pulled flush against crotch plate 8, when in a rear facing impact.

In some embodiments, as mentioned, crotch plate 8 may comprise one or more openings 9 configured to facilitate different mountings for the crotch buckle assembly. Each of these different openings may be used depending on a size of the child. For example, the third horizontal slot furthest to the right/back of FIG. 1 may be used for a smaller child. The openings or slots 9 may facilitate crotch buckle anchor plate 33 attached to crotch buckle 30 (e.g., via crotch strap 31) into different positions. In some embodiments, crotch buckle anchor plate 33 may be a rectangular piece of sheet metal.

Figure 8:
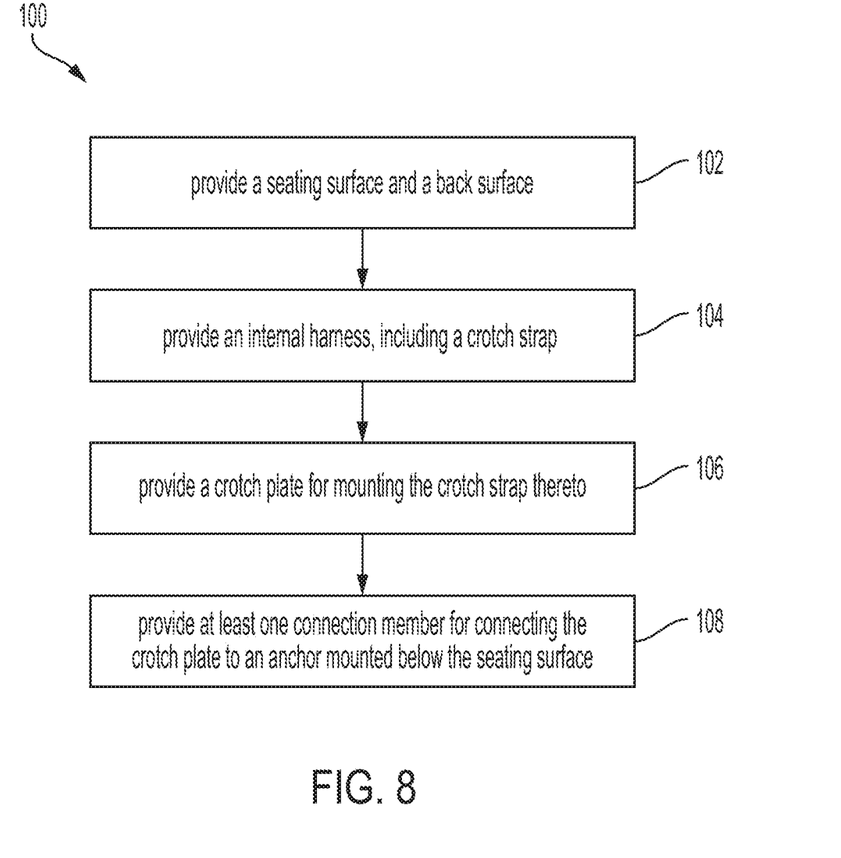
FIG. 8 illustrates a process for providing a child car seat, in accordance with one or more embodiments.

FIG. 8 illustrates method 100 for providing a child car seat, in accordance with one or more embodiments. Method 100 may be performed with mechanical components and one or more technicians. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 8 and described below is not intended to be limiting.

At operation 102 of method 100, a seating surface and a back surface may be provided. As an example, an installer may attach seat pan 60 to seat back 55. Seat pan 60 may comprise a set of openings 9 for allowing therethrough crotch strap 31, which may be attached to crotch buckle 30.

At operation 104 of method 100, an internal harness, including a crotch strap, may be provided. As an example, the installer may attach harness 35 to hip anchors 38 and crotch buckle 30.

At operation 106 of method 100, a crotch plate for mounting the crotch strap thereto may be provided. As an example, the installer may use rivets 9 for attaching crotch plate 8 to a bottom surface of seat pan 60. In some embodiments, crotch strap 31 may pass through one of the openings 9 of seat pan 60 for coupling to crotch plate 8.

At operation 108 of method 100, at least one connection member for connecting the crotch plate to an anchor mounted below the seating surface may be provided. As an example, the installer may attach one or more straps 20 to anchor plates 15 and to crotch plate 8. In some embodiments, connection member(s) 20 may significantly resist movement in a first direction but significantly allow movement in a second direction opposite from the first direction.

Several embodiments of the invention are specifically illustrated and/or described herein. However, it will be appreciated that modifications and variations are contemplated and within the purview of the appended claims.

What is claimed is:

1. A child car seat, comprising:
   a seating surface and a back surface;
   an internal harness, including a crotch strap;
   a crotch plate for mounting the crotch strap thereto, the crotch plate mounted directly to an underside of the seating surface; and
   at least one connection member for connecting the crotch plate to an anchor mounted below the seating surface,
   wherein the connection member significantly resists movement in a first direction and significantly allows movement in a second direction different from the first direction.

2. The child car seat of claim 1, wherein the first direction is generally from the anchor towards the crotch plate, and
   wherein the second direction is generally from the crotch plate towards the anchor.

3. The child car seat of claim 2, wherein the crotch plate extends in a transverse direction with respect to the first and second directions.

4. The child car seat of claim 1, wherein the anchor comprises two or more anchor plates.

5. The child car seat of claim 4, wherein the connection member comprises two or more straps each separately coupled to one of the anchor plates and the crotch plate.

6. The child car seat of claim 5, wherein each of the two or more straps comprises an intermediate stitching portion and two end portions.

7. The child car seat of claim 6, wherein the crotch plate comprises two or more loops respectively around which one of the end portions of each of the straps loops.

8. The child car seat of claim 4, further comprising:
   a frame,
   wherein each of the anchor plates is attached to the frame.

9. The child car seat of claim 1, further comprising:
   a crotch buckle coupled to an end of the crotch strap.

10. The child car seat of claim 9, wherein the crotch plate comprises a set of openings configured to facilitate the mounting of another end of the crotch strap thereto.

11. The child car seat of claim 10, wherein the mounting of the other end of the crotch strap to the crotch plate is performed via a crotch anchor plate.

12. The child car seat of claim 1, wherein the seat is convertible between front-facing and rear-facing.

13. The child car seat of claim 1, wherein the connection member is configured to a predetermined stiffness in tension.

14. The child car seat of claim 13, wherein the connection member provides negligible resistance in the second direction, the second direction being compressive.

15. The child car seat of claim 14, wherein the seating surface is configured to adjust only in the compressive direction.

16. The child car seat of claim 1, wherein the crotch plate is comprised of steel.

17. The child car seat of claim 1, wherein the crotch plate is flat.

18. A method, comprising:
   providing a seating surface and a back surface;
   providing an internal harness, including a crotch strap;
   providing a crotch plate for mounting the crotch strap thereto, the crotch plate mounted directly to an underside of the seating surface; and providing at least one connection member for connecting the crotch plate to an anchor mounted below the seating surface, wherein the connection member significantly resists movement in a first direction and significantly allows movement in a second direction different from the first direction.

19. A child car seat, comprising:

a seating surface and a back surface;

an internal harness, including a crotch strap;

a crotch plate for mounting the crotch strap thereto, the crotch plate positioned below the seating surface; and at least one connection member for connecting the crotch plate to an anchor mounted below the seating surface, the connection member defined by a strap, wherein the connection member significantly resists movement in a first direction and significantly allows movement in a second direction different from the first direction.

\* \* \* \* \*